United States Patent
Tsuzuki et al.

(10) Patent No.: US 7,831,927 B2
(45) Date of Patent: Nov. 9, 2010

(54) IMAGE FORMING DEVICE AND IMAGE FORMING METHOD

(75) Inventors: Toru Tsuzuki, Okazaki (JP); Masashi Kato, Nagoya (JP); Hiroyuki Yamamoto, Nagoya (JP); Kazuma Aoki, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 517 days.

(21) Appl. No.: 11/691,650

(22) Filed: Mar. 27, 2007

(65) Prior Publication Data

US 2007/0245237 A1 Oct. 18, 2007

(30) Foreign Application Priority Data

Mar. 31, 2006 (JP) ............................. 2006-098987

(51) Int. Cl.
*G06F 3/048* (2006.01)
*G03G 15/00* (2006.01)

(52) U.S. Cl. ................. 715/810; 715/817; 715/825; 715/838; 101/2

(58) Field of Classification Search ................ 715/810
See application file for complete search history.

(56) References Cited

U.S. PATENT DOCUMENTS

| | | | |
|---|---|---|---|
| 5,706,411 A * | 1/1998 | McCormick et al. | 358/1.14 |
| 6,237,010 B1 * | 5/2001 | Hui et al. | 715/205 |
| 6,469,770 B2 * | 10/2002 | Hoshino et al. | 355/40 |
| 6,801,334 B1 | 10/2004 | Enomoto | |
| 6,867,877 B1 * | 3/2005 | Edatsune et al. | 358/1.15 |
| 6,917,440 B2 * | 7/2005 | Kondo et al. | 358/1.15 |
| 6,954,284 B2 | 10/2005 | Enomoto | |
| 7,139,908 B2 * | 11/2006 | Hamamoto et al. | 713/2 |
| 2001/0031150 A1 | 10/2001 | Shimada et al. | |
| 2003/0147097 A1 | 7/2003 | Kotani et al. | |
| 2004/0041913 A1 * | 3/2004 | Takasumi et al. | 348/207.2 |
| 2004/0085552 A1 * | 5/2004 | Ueda | 358/1.2 |

FOREIGN PATENT DOCUMENTS

| | | |
|---|---|---|
| JP | 11341256 | 12/1999 |
| JP | 2001-309116 | 11/2001 |

(Continued)

OTHER PUBLICATIONS

Office Action received for counterpart Japanese Patent Application 2006-098987 mailed on Dec. 11, 2009.

*Primary Examiner*—Tadesse Hailu
*Assistant Examiner*—Nicholas S Ulrich
(74) *Attorney, Agent, or Firm*—Banner & Witcoff, Ltd

(57) ABSTRACT

An image forming device includes a display, a reading unit, a display controlling unit, and an operating unit. The reading unit reads at least one file stored in a removable memory. The display controlling unit displays on the display a first selection item together with at least one second selection item. The first selection item is used for performing index printing for the at least one file. The at least one second selection item is used for printing each of the at least one file. Each of the at least one second selection item corresponds to one of the at least one file. The operating unit is capable of selecting one of the first selection item and the at least one second selection item.

16 Claims, 8 Drawing Sheets

FOREIGN PATENT DOCUMENTS

| | | |
|---|---|---|
| JP | 2003231323 | 8/2003 |
| JP | 2004-280417 | 10/2004 |
| JP | 2004312124 A * | 11/2004 |
| JP | 2005-038308 | 2/2005 |
| JP | 2005-109907 | 4/2005 |
| JP | 2005151470 | 6/2005 |
| JP | 2006-076186 | 3/2006 |

* cited by examiner

IMAGE FORMING DEVICE AND IMAGE FORMING METHOD

CROSS REFERENCE TO RELATED APPLICATIONS

This application claims priority from Japanese Patent Application No. 2006-098987 filed Mar. 31, 2006. The entire content of priority application is incorporated herein by reference.

TECHNICAL FIELD

The present invention relates to an image forming device and an image forming method.

BACKGROUND

There is known an image forming device which can read out image files stored in a removable memory such as a USB memory and print image files in a list of reduced images (index printing). For example, Japanese Patent Application Publication No. 11-341256 discloses that an index print creating method and an image processing system that a user can be easily recognize the finish of each image.

On the other hand, there is well known an image forming device which directly prints out each file stored in a removable memory without using a personal computer (direct printing or file printing).

SUMMARY

Aspects of the present invention relate to an image forming device and an image forming method in which the user can easily carry out operations of the index printing and the file printing.

In another aspect of the invention provides an image forming device including a display, a reading unit, a display controlling unit, and an operating unit. The reading unit reads at least one file stored in a removable memory. The display controlling unit displays on the display a first selection item together with at least one second selection item. The first selection item is used for performing index printing for the at least one file. The at least one second selection item is used for printing each of the at least one file. Each of the at least one second selection item corresponds to one of the at least one file. The operating unit is capable of selecting one of the first selection item and the at least one second selection item.

In still another aspect of the present invention, there is provided an image forming method including:

detecting a removable memory that stores at least one file;

reading out the at least one file stored in the removable memory when the removable memory is detected;

displaying a first selection item together with at least one second selection item on a display, the first selection item being used for performing index printing for the at least one file, the at least one second selection item being used for printing each of the at least one file, each of the plurality of second selection items corresponding to each of the at least one file.

DETAILED DESCRIPTION

Now, an image forming device and an image forming method according to a preferred embodiment of the present invention will be described with reference to the accompanying drawings. Hereinafter, a multifunction device having a facsimile function, a copying function and a scanning function is used as an example of the image forming device. However, all of these functions are not required for putting the present embodiment into practice and an image forming device having at least one of these functions will do.

Figure 1:
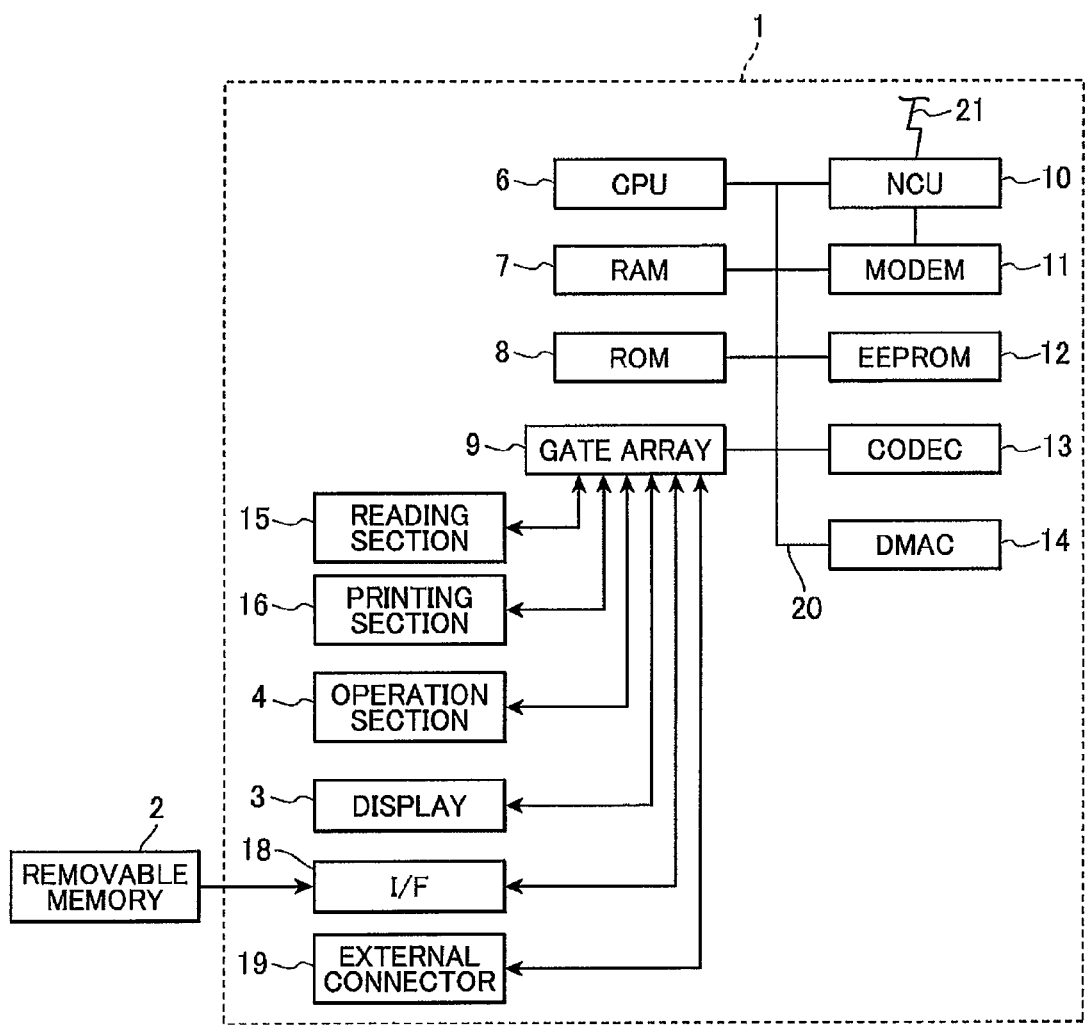
FIG. 1 is a block diagram showing an image forming device according to a preferred embodiment of the present invention.

FIG. 1 is a block diagram showing an image forming device 1. As shown in FIG. 1, the image forming device 1 includes a CPU 6, a RAM 7, a ROM 8, a gate array 9, a NCU (Network Control Unit) 10, a modem 11, an EEPROM 12, a codec 13, and a DMAC (Direct Memory Access Controller) 14. These components are connected to each other by a bus line 20. The bus line 20 includes an address bus, a data bus and a control signal line. Further, a reading section 15, a printing section 16, an operation section 4, a display 3, an interface (I/F) 18, in which a removable memory 2 can be mounted, and an external connector 19 are connected to the gate array 9. A telephone line is connected to the NCU 10.

Figure 2:
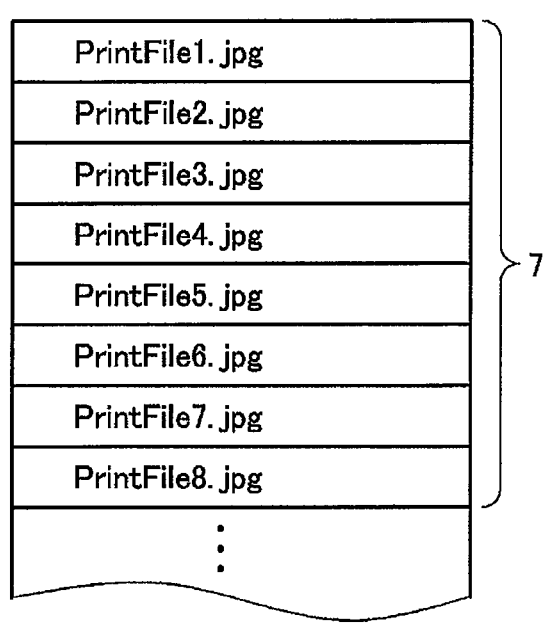
FIG. 2 is a schematic diagram showing a file stored in a removable memory of the image forming device shown in FIG. 1.

The removable memory 2 is a storage medium, for example, such as a USB memory, a smart media, a compact flash (trademark registered) or a small HDD and can be removably mounted in the I/F 18. As shown in FIG. 2, the removable memory 2 stores a plurality of files 7 (PrintFile1.jpg through PrintFile8.jpg). As will be described later, the image forming device 1 can perform index printing for reduced images of the plurality of files 7. In addition, the image forming device 1 can print out each of the plurality of files 7 individually.

Figure 3:
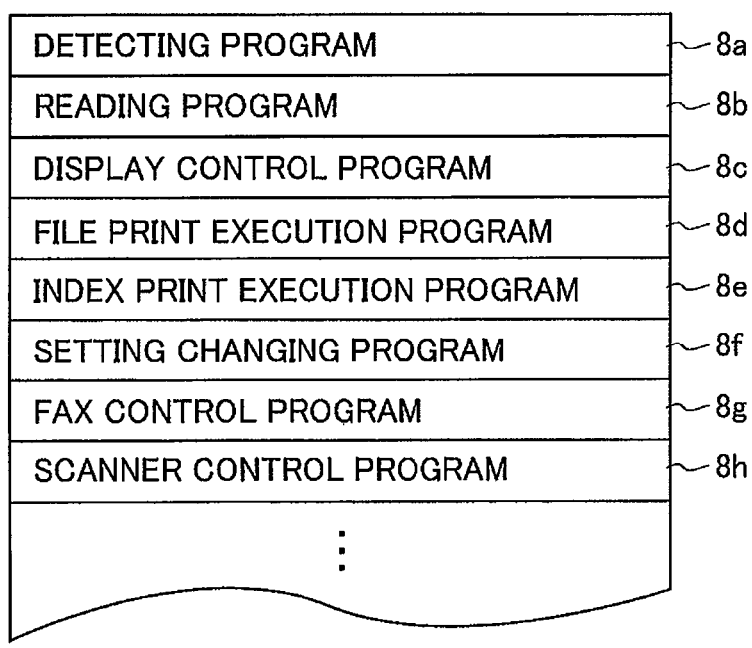
FIG. 3 is a view showing programs stored in a ROM of the image forming device according to the preferred embodiment of the present invention.

As shown in FIG. 3, various programs such as a detecting program 8a, a reading program 8b, a display control program 8c, a file print execution program 8d, a index print execution program 8e, a setting changing program 8f, a FAX control program 8g, and a scanner control program 8h. The detecting program 8a, the reading program 8b, the display control program 8c, the file print execution program 8d, the index print execution program 8e, and the setting changing program 8f are used on the image forming method in the present invention.

The detecting program 8a detects that the removable memory 2 is mounted to the I/F 18. The reading program 8b reads out the files 7 stored in the removable memory 2 when the removable memory 2 is mounted. The display control program 8c displays a first selection item 5 together with a file printing mode (refer to FIG. 4). The first selection item 5 is used for the index printing of a plurality of printable files 7. In the file printing mode, a list of files 7 is displayed on the display 3 individually as a plurality of selectable second selection items 6. The file print execution program 8d executes file printing of a specific second selection item 6 when the specific second selection item 6 is selected from the list of the files 7 by a user. The index print execution program 8e prints a list of the files 7 including reduced images and file names when the first selection item 5 for the index printing is selected by the user. The setting changing program 8f changes a selected state of the file printing or the index printing into a state before a start of the file printing or the index printing when the file printing or the index printing is finished.

The detecting program 8a, the reading program 8b, the display control program 8c, the file print execution program 8d, the index print execution program 8e, and the setting changing program 8f are executed in the CPU 17.

The FAX control program 8g and the scanner control program 8h control a facsimile function and a scanner function, respectively.

The NCU 10 shown in FIG. 1 is connected to the public telephone line 21 and performs network control such as connection/disconnection of the public telephone line 21. Moreover, the RAM 28 is used as a line buffer memory for the work area of the CPU 17 and the expansion area of read images. The modem 11 modulates and demodulates facsimile data. The ROM 8 stores data such as the various programs 8a through 8f shown in FIG. 3, setting value and the like. The codec 13 codes and decodes facsimile data. The DMCA 14 writes and reads data mainly to/from the RAM 28.

The gate array 9 functions as an input/output interface to the CPU 17 and the reading section 15 and the like. The reading section 15 is provided with an image sensor and a LED light source and reads images such as characters and figures from documents. The printing section 16 prints out the images of characters and figures, for example, by means of ink-jet method or laser-method. The operation section 4 is provided with a group of key switches such as numeric keypad and character keypad and transmits instructions to the CPU 17 according to key operations by the user. The display 3 is provided with a panel such as LCD. The external connector 19 is provided with connection ports conforming to the standards such as Centronics parallel interfaces and USBs (Universal Serial Buses).

Figure 4:
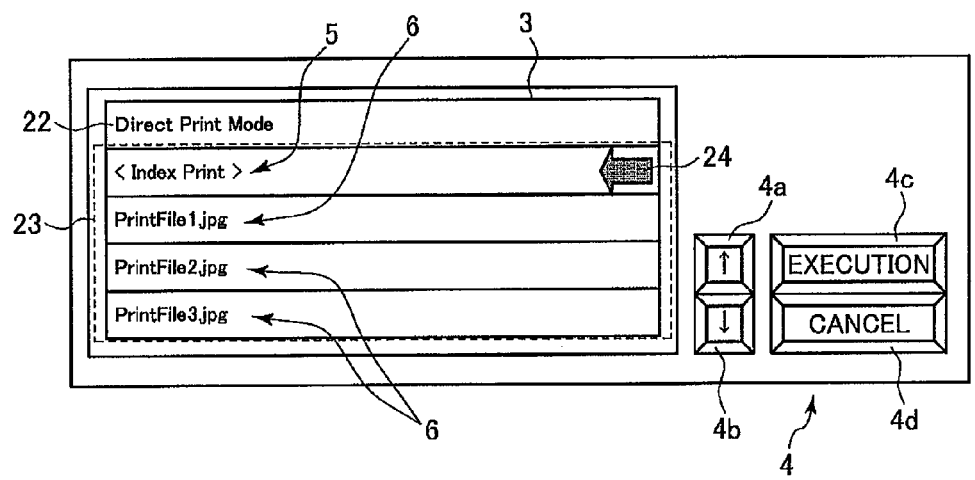
FIG. 4 is a view showing an initial screen of a file printing mode displayed on a display of the image forming device according to the preferred embodiment of the present invention.

FIG. 4 shows the display 3. The display 3 includes a mode display section 22 and a selection item display section 23. The mode display section 22 displays "Direct Print Mode". "Direct Print Mode" indicates a mode (file printing mode) in which each of the files 7 stored in the removable memory 2 can be directly printed. On the top of the selection item display section 23, the first selection item 5 (<Index Print>) for the index printing of the files 7 is displayed. In addition, a list of the files 7 such as "PrintFile1.jpg" and "PrintFile2.jpg" is displayed individually as a plurality of selectable second selection items 6 below the first selection item 5 in the selection item display section 23.

Figure 5:
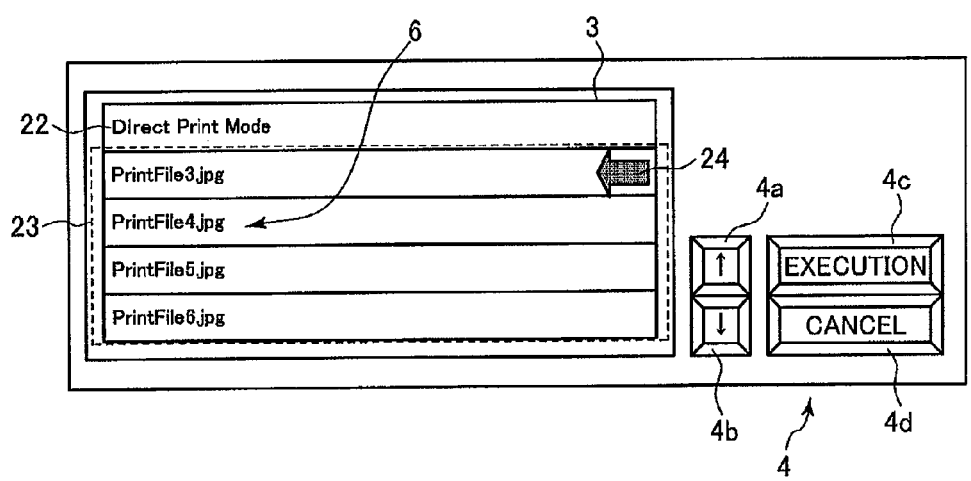
FIG. 5 is a view showing a state in which displayed files are changed from the initial screen shown in FIG. 4 by pressing a down scroll key a plurality of times.

The operation section 4 is provided on the right side of the display 3. The operation section 4 includes an up scroll key 4a, a down scroll key 4b, an execution key 4c, and a cancel key 4d. When the up scroll key 4a and the down scroll key 4b are operated, the content displayed in the selection item display section 23 moves up and down. Thereby, a selecting mark 24 can be aligned with the first selection item 5 for the index printing or the second selection item 6. As shown in FIG. 5, when the execution key 4c is pressed while the selecting mark 24 is aligned with the desired second selection item 6, the file 7 corresponding to the desired second selection item 6 is printed. In addition, as shown in FIG. 4, by pressing the execution key 4c while the selecting mark 24 is aligned with the first selection item 5 for the index printing, the index printing is executed.

Figure 6:
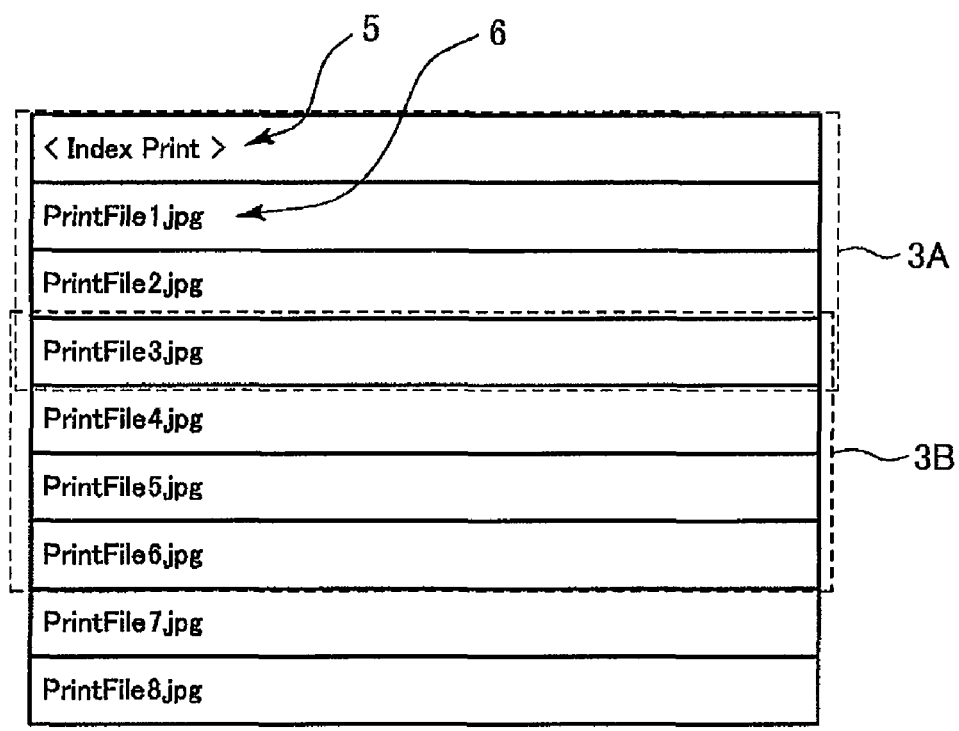
FIG. 6 is a view showing a list of a first selection item and a plurality of second selection items of the image forming device according to the preferred embodiment of the present invention.

A list of the first selection item 5 and the plurality of second selection items 6 is shown in FIG. 6. A displaying region 3A in FIG. 6 indicates the first selection item 5 and the second selection items 6 shown in FIG. 4. A displaying region 3B in FIG. 6 indicates the second selection items 6 shown in FIG. 5. When the up scroll key 4a or the down scroll key 4b is pressed once, the content displayed on the selection item display section 23 scrolls by one row. Thereby, the user can align the selecting mark 24 with the target second selection item 6. In an initial screen of the file printing mode shown in FIG. 4, the first selection item 5 for the index printing and the first three second selection items 6 are displayed on the display 3. Each time the down scroll key 4b is pressed, the content below the displayed second selection items 6 is displayed by one row. Therefore, when the down scroll key 4b is pressed for three times, the content as shown in FIG. 5 is displayed.

Figure 7:
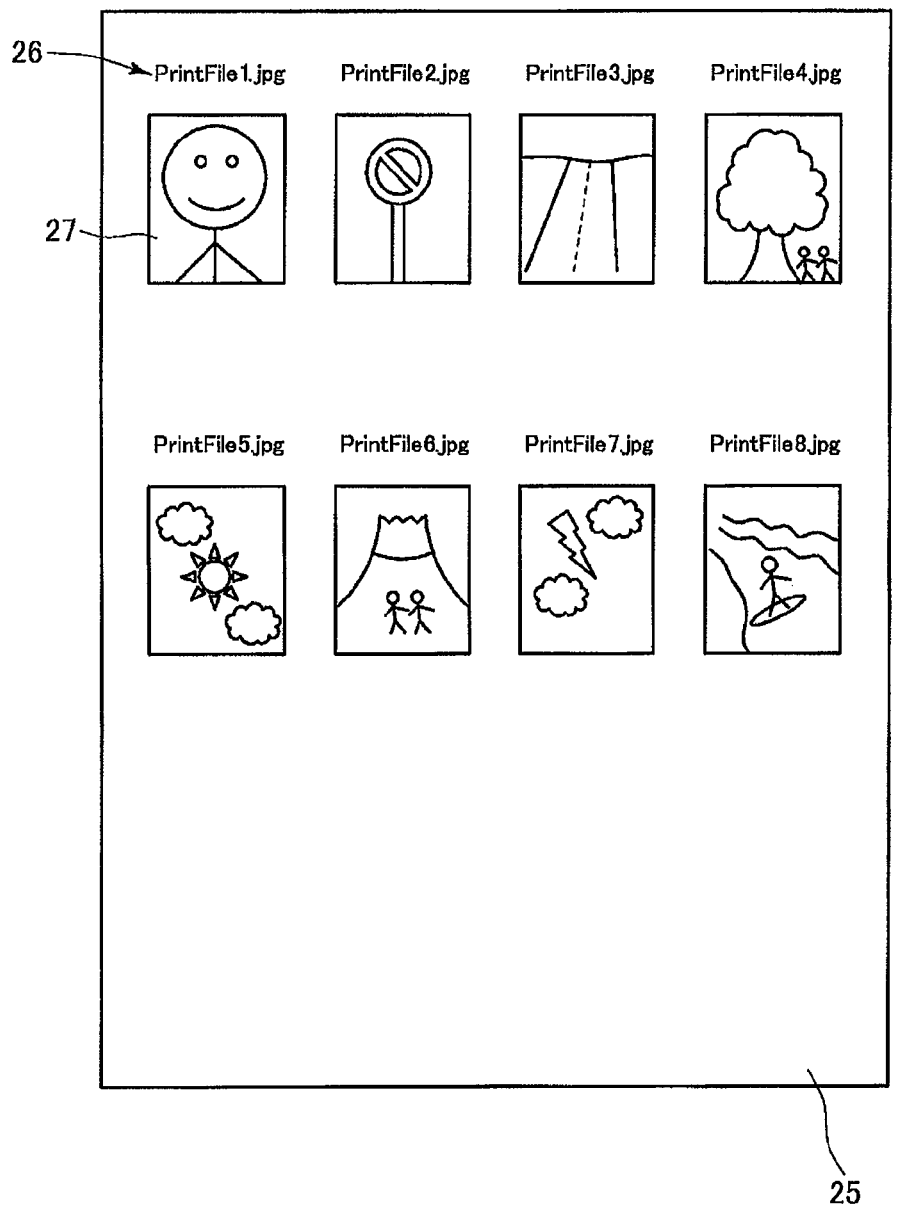
FIG. 7 is a view showing a printing result of the index printing of the image forming device according to the embodiment of the present invention.

On the other hand, as described above, when the execution key 4c is pressed while the first selection item 5 (refer to FIG. 4) is selected, the index printing is executed. As shown in FIG. 7, in the index printing, reduced images 27 and the file names 23 corresponding to the plurality of files 7 stored in the removable memory 3 are printed on a paper sheet 25 on predetermined positions. In the index printing, the user can immediately recognize what image is recorded in each of the files 7, and easily determine a file to be printed.

While the index printing is carried out, for example, "NOW INDEX PRINTING" is displayed on the display 3. When the index printing is finished, the display of the displaying unit 3 returns to the state shown in FIG. 4, that is, the state immediately before the index printing is selected and executed. Thereby, the user can subsequently select another file of the files 7 with ease.

After the index printing in FIG. 7, the user carries out the operation of printing of the target file 7. For example, if the user intends to print out "PrintFile3.jpg", the user operates the down scroll key 4b to align the selecting mark 24 with "PrintFile3.jpg". Next, when the user presses the execution key 4c, printing of the "PrintFile3.jpg" is executed. While the file printing is carried out, for example, "NOW FILE PRINTING" is displayed on the display 3.

Figure 8:
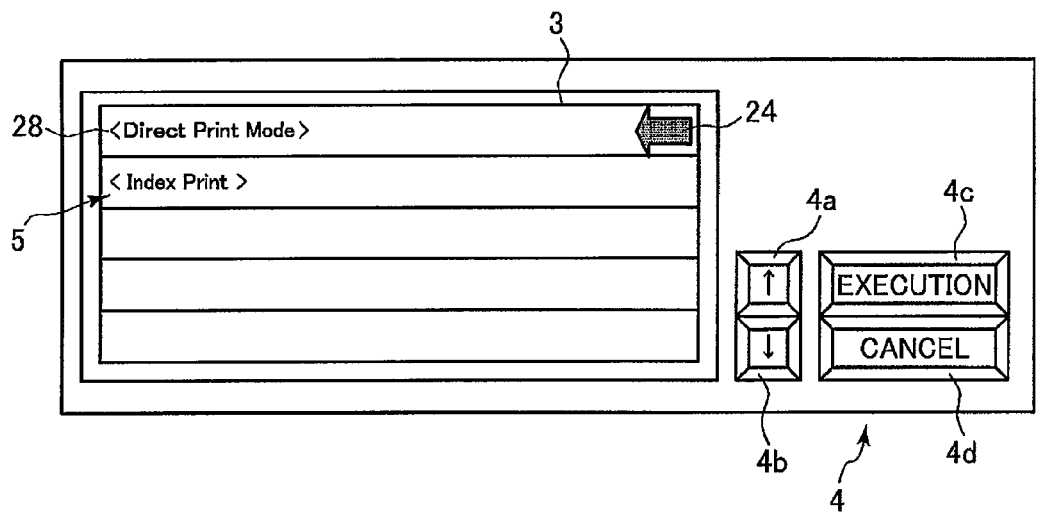
FIG. 8 is a view showing an initial screen of a file printing mode and the index printing displayed on the display of a conventional image forming device.
Figure 9:
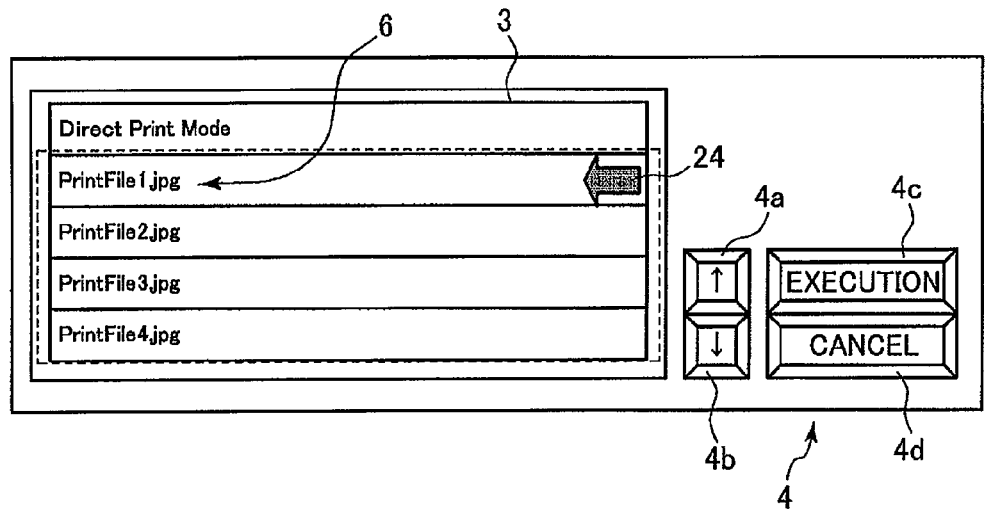
FIG. 9 is a view showing a state of the display after the file printing mode shown in FIG. 8 is selected.

As described above, in the image forming device 1 of the present embodiment, the first selection item 5 for carrying out the index printing is displayed together with the file printing mode. Therefore, the user can subsequently select the second selection item 6 after carrying out the index printing. Thereby, the operability of printing can be improved. In a conventional image forming device, as shown in FIG. 8, a selection item 28 for carrying out the file printing and the first selection item 5 for carrying out the index printing are displayed next to each other. Therefore, the user needs an operation of selecting one of them. That is, in order to print each of the files 7 after the user selects and executes the first selection item 5 to carry out the index printing, the user needs to select and execute the selection item 28 to move to the file printing mode shown in FIG. 9. Thereafter, the user needs to select the target second selection item 6 and press the execution key 4c. Therefore, the operation is complicated. However, in the present embodiment, the file printing mode is automatically displayed after the index printing is completed. Accordingly, as compared with the conventional device, the operation of moving to the file printing mode can be omitted for one step and the operation is simplified. In addition, in the image forming device 1 of the present embodiment, the first selection item 5 for the index printing is displayed together with the second selection item 6 for the file printing. Therefore, the user does not need to remember both an operating method of a menu for the index printing and an operating method of a menu for the file printing. For this reason, even a beginner can easily operate the image forming device 1. Further, there is no need to provide a button for switching the menu of the index printing and the menu of the file printing. Therefore, the number of component parts of the image forming device 1 can be reduced, and a configuration of the image forming device 1 can be simplified.

Figure 10:
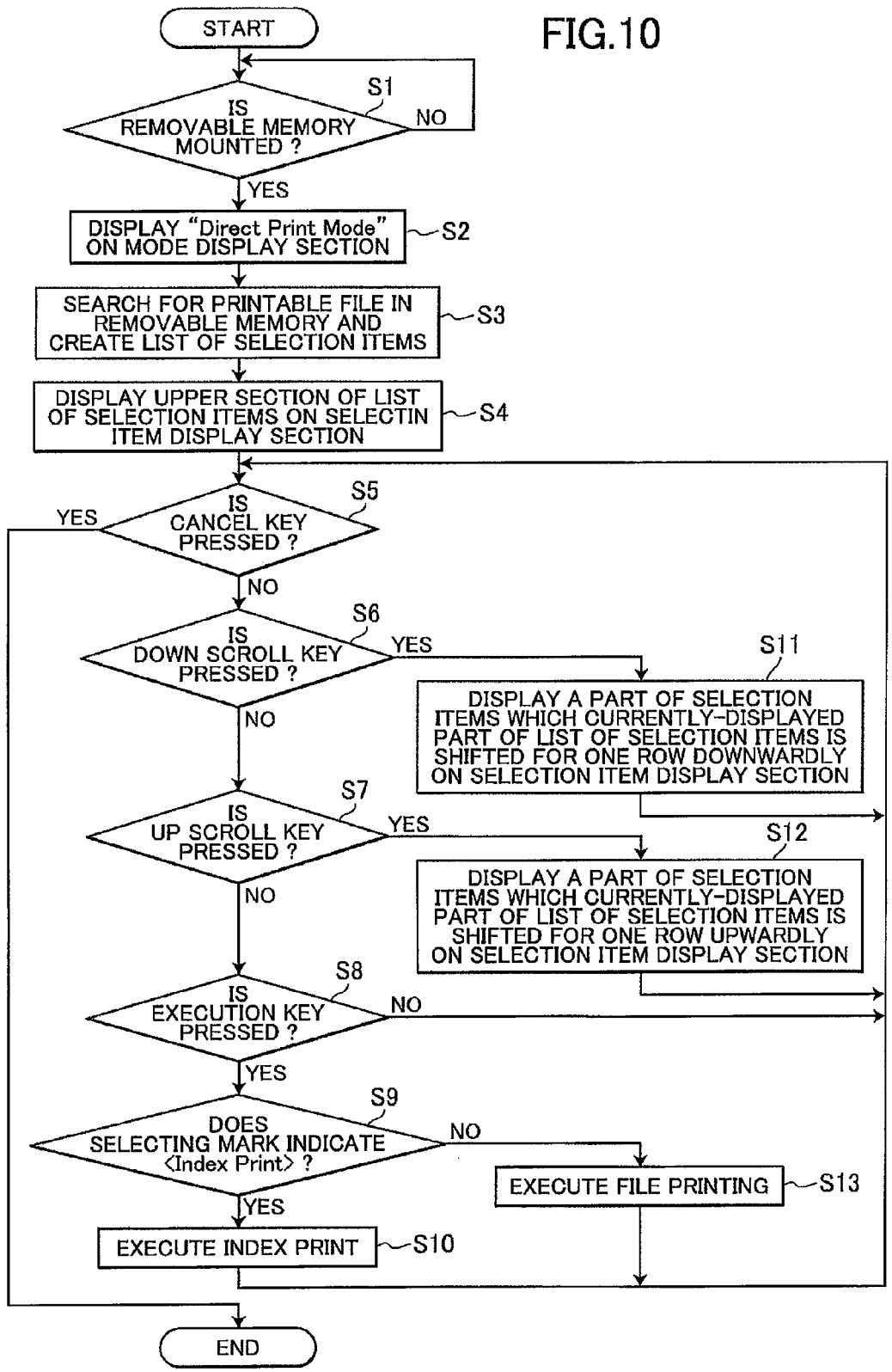
FIG. 10 is a flowchart when an image is printed by an image forming method according to the preferred embodiment of the present invention.

Next, an image forming method of the present embodiment will be described. Specifically, operations of the detecting program 8a, reading program 8b, display control program 8c, file print execution program 8d, index print execution program 8e, and setting changing program 8f will be described by using a flowchart in FIG. 10. First, in S1 the CPU 17 determines whether the removable memory 2 is mounted to the I/F 18. If the removable memory 2 is mounted (S1: YES), the CPU 17 advances to S2. In S2, the CPU 17 displays "Direct Print Mode" on the mode display section 22 (refer to FIG. 4).

After the above process, the CPU 17 advances to S3, and the CPU 17 searches for the printable files 7 in the removable memory 2, and creates data for displaying the searched printable files 7 on the displaying unit 3. That is, the CPU 17 creates the list of the first selection item 5 and the plurality of second selection items 6 as shown in FIG. 6. Here, if the displaying unit 3 is capable of displaying only 2 rows as described later, the first selection item 5 is allocated below (next to a trailing end of) the plurality of second selection items 6. On the other hand, as shown in FIGS. 4 and 5, if the displaying unit 3 can display three rows or more, the first selection item 5 is allocated above (next to a leading end of) the plurality of second selection items 6. It is noted that in S3 the CPU 17 may determine whether the searched printable files 7 are of the same kind, that is, the files 7 have the same extension, and may create the first selection item 5 only when the printable files 7 are of the same kind.

Next, in S4 the CPU 17 displays the list of selection items 5 and 6 created in S3 on the selection item display section 23. In practice, the list of selection items 5 and 6 is displayed only for the number of selection items which can be displayed on the selection item display section 23. That is, the upper section of the list of first and second selection items 5 and 6 is displayed on the selection item display section 23. Thereafter, in S5 the CPU 17 determines whether the cancel key 4d is pressed or not. If the cancel key 4d is pressed (S5: YES), the process is terminated. If the cancel key 4d is not pressed (S5: NO), the CPU 17 advances to S6. In S6, the CPU 17 determines whether the down scroll key 4b is pressed or not. If the down scroll key 4b is pressed (S6: YES), the CPU 17 advances to S11. In S11, a part of the list of selection items 5 and 6 which the currently-displayed part of selection items 5 and 6 is shifted for one row downwardly is displayed on the selection item display section 23.

After completing the process of S11, the CPU 17 returns to S5. On the other hand, if the down scroll key 4b is not pressed (S6: NO), the CPU 17 advances to S7. Next, the CPU 17 determines whether the up scroll key 4a is pressed or not. If the up scroll key 4a is pressed (S7: YES), the CPU 17 advances to S12. Then, a part of the list of selection items 5 and 6 which the currently-displayed part of the list of selection items 5 and 6 is shifted for one row upwardly is displayed on the selection item display section 23. After completing the process of S12, the CPU 17 returns to S5.

If the up scroll key 4a is not pressed (S7: NO), the CPU 17 advances to S8 and determines whether the execution key 4c is pressed or not. Here, if the execution key 4c is not pressed (S8: NO), the CPU 17 returns to S5. If the execution key 4c is pressed (S8: YES), the CPU 17 advances to S9. In S9, the CPU 17 determines whether the selecting mark 24 indicates the first selection item 5 for the index printing. If the selecting mark 24 indicates the first selection item 5 (S9: YES), the CPU 17 advances to S10 and executes the index printing. On the other hand, if the selecting mark 24 does not indicate the first selection item 5 (S9: NO), one of the second selection items 6 indicated by the selecting mark 24 is printed (S13).

As described above, according to the image forming device and the image forming method of the present embodiment, the first selection item 5 for the index printing of the files 7 is displayed in the file printing mode which displays the second selection items 6 of the files 7 individually on the display 3. Therefore, the user does not need to select the file printing mode after the index printing is finished, and the operation can be carried out easily.

Figure 11:
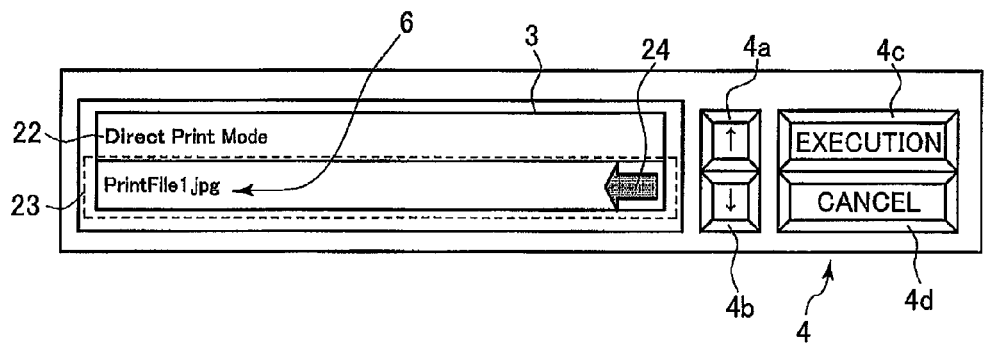
FIG. 11 is a view showing an initial screen of the file printing mode displayed on the display of the image forming device according to another embodiment of the present invention.
Figure 12:
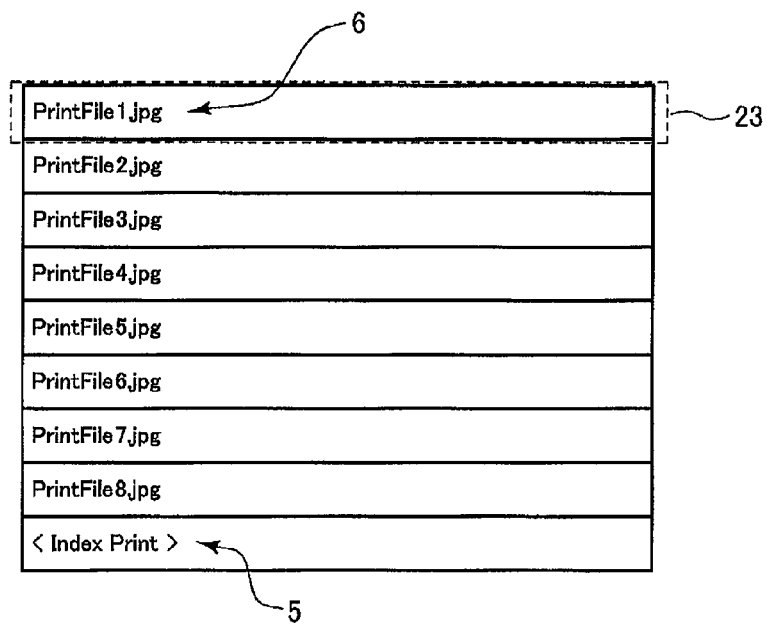
FIG. 12 is a view showing a list of the first selection item and the plurality of second selection items of the image forming device according to the another embodiment of the present invention.

Next, another embodiment of the present invention is shown in FIGS. 11 and 12. The display 3 in the another embodiment is capable of displaying only two rows. Further, in an initial screen of the file printing mode, the second selection item 6 for the file printing is displayed on the selection item display section 23. Here, if the first selection item 5 for the index printing is displayed on the selection item display section 23 in the initial screen of the file printing mode, the user who is not used to the image processing device may have no idea how to operate the image processing device and be confused. In order to overcome this problem, the first selection item 5 for the index printing can be displayed on the bottom of the list of selection items. That is, as shown in a list of the first selection item 5 and the plurality of second selection items 6 in FIG. 12, the first selection item 5 for the index printing is allocated below the second selection item 6. In this way, the second selection item 6 is displayed on the selection item display section 23 in the initial screen shown in FIG. 11. Therefore, even the user who is not used to the image processing device can easily guess the operating method. By the user operating the down scroll key 4b, the second selection items 6 below "PrintFile1.jpg" are sequentially displayed, and after the last second selection item 6 "PrintFile8.jpg" is displayed, the first selection item 5 is displayed.

In the initial screen shown in FIG. 11, that is, in a state where "PrintFile1.jpg" is displayed, the first selection item 5 for the index printing located at the bottom of the list of selection items 5 and 6 can be displayed on the selection item display section 23 by pressing the up scroll key 4a once. In this manner, even in a case where a number of files of the second selection items 6 exist, the user does not need to press the down scroll key 4b many times in order to select the first selection item 5. As described above, even in the displaying unit 3 which can display only two rows, the first selection item 5 is allocated on the bottom of the selection items 5 and 6. In this manner, the second selection item 6 of the files 7 can be displayed on the initial screen of the file printing mode, and the user is prevented from being confused by not understanding the operating method.

What is claimed is:

1. An image forming device comprising:
   a display;
   a reading unit that reads a plurality of files stored in a removable memory;
   a display controlling unit that displays on the display a plurality of selection items that are arranged in a single line, the plurality of selection items including a first selection item and a plurality of second selection items corresponding to the plurality of files respectively, the first selection item being used for performing index printing for the plurality of files, each of the plurality of second selection items indicating a file name of a corresponding file, each of the plurality of second selection items being used for printing the corresponding file, the first selection item being allocated next to a leading end or trailing end of the plurality of second selection items in the single line; and
   an operating unit that is capable of selecting one of the plurality of selection items.

2. The image forming device according to claim 1, comprising:
   a file print execution unit that executes printing of a file of a selected second selection item when any one of the plurality of second selection items is selected on the operating unit; and
   an index print execution unit that executes printing of a list of the plurality of files when the first selection item is selected on the operating unit.

3. The image forming device according to claim 2, wherein the list includes a reduced image and a file name of each of the plurality of files.

4. The image forming device according to claim 2, wherein the display controlling unit displays a predetermined indication on the display while one of the plurality of files or the list is being printed.

5. The image forming device according to claim 4, comprising:
   a setting changing unit that changes, after printing is completed, the display from a state in which the predetermined indication is displayed into another state in which the first selection item and the plurality of selection items are displayed.

6. The image forming device according to claim 1, wherein the plurality of second selection items are arranged in the single line, and the first selection item is allocated next to a leading end or a trailing end of the single line.

7. The image forming device according to claim 1, further comprising a printing unit, wherein the plurality of files are a printable file by the printing unit and the display controlling unit displays the first selection item on the display when the plurality of files are of the same kind.

8. The image forming device according to claim 1, further comprising a printing unit, wherein the plurality of files are a printable file by the printing unit and the index printing is performed when the plurality of files are of the same kind.

9. An image forming method comprising:
   detecting a removable memory that stores a plurality of files;
   reading out the plurality of files stored in the removable memory when the removable memory is detected;
   displaying a plurality of selection items that are arranged in a single line on a display, the plurality of selection items including a first selection item and a plurality of second selection items corresponding to the plurality of files respectively, the first selection item being used for performing index printing for the plurality of files, each of the plurality of second selection items indicating a file name of a corresponding file, each of the plurality of second selection items being used for printing the corresponding file, the first selection item being allocated next to a leading end or trailing end of the plurality of second selection items in the single line.

10. The image forming method according to claim 9, further comprising:
    printing a file of a selected second selection item when any one of the plurality of second selection items is selected; and
    printing a list of the at least one file when the first election item is selected.

11. The image forming method according to claim 9, wherein the list includes a reduced image and a file name of each of the plurality of files.

12. The image forming method according to claim 9, further comprising:
    displaying a predetermined indication on the display while one of the plurality of files or the list is being printed.

13. The image forming method according to claim 12, further comprising:
    changing, after printing is completed, the display from a state in which the predetermined indication is displayed into another state in which the first selection item and the plurality of second selection items are displayed.

14. The image forming method according to claim 9, wherein the plurality of second selection item are arranged in a row, and the first selection item is allocated next to a leading end or a trailing end of the single line.

15. The image forming method according to claim 9, wherein the plurality of files are a printable file and the first selection item is displayed on the display when the plurality of files are of the same kind.

16. The image forming method according to claim 9, wherein the plurality of files are a printable file and the index printing is performed when the plurality of files are of the same kind.

* * * * *